(12) United States Patent
Wang et al.

(10) Patent No.: US 11,808,980 B2
(45) Date of Patent: Nov. 7, 2023

(54) ULTRA-COMPACT SILICON WAVEGUIDE MODE CONVERTER BASED ON META-SURFACE STRUCTURE

(71) Applicant: SHANGHAI JIAOTONG UNIVERSITY, Shanghai (CN)

(72) Inventors: Hongwei Wang, Shanghai (CN); Yong Zhang, Shanghai (CN); Yu He, Shanghai (CN); Lu Sun, Shanghai (CN); Yikai Su, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 151 days.

(21) Appl. No.: 16/977,351

(22) PCT Filed: Jun. 25, 2019

(86) PCT No.: PCT/CN2019/092618
§ 371 (c)(1),
(2) Date: Sep. 1, 2020

(87) PCT Pub. No.: WO2020/232792
PCT Pub. Date: Nov. 26, 2020

(65) Prior Publication Data
US 2023/0103057 A1    Mar. 30, 2023

(30) Foreign Application Priority Data
May 23, 2019    (CN) ............................ 201910432113

(51) Int. Cl.
*G02B 6/26*    (2006.01)
*G02B 6/42*    (2006.01)
(Continued)

(52) U.S. Cl.
CPC ............... *G02B 6/14* (2013.01); *G02B 6/136* (2013.01); *G02B 2006/12061* (2013.01);
(Continued)

(58) Field of Classification Search
CPC ................................ G02B 6/14; G02B 6/136; G02B 2006/12061; G02B 2006/12097;
(Continued)

(56) References Cited

U.S. PATENT DOCUMENTS

5,138,687 A * 8/1992 Horie ................... G02B 6/1221
385/129
11,098,274 B2 * 8/2021 Shi ........................... C12Q 1/02
(Continued)

*Primary Examiner* — Kaveh C Kianni
*Assistant Examiner* — Hung Q Lam
(74) *Attorney, Agent, or Firm* — CBM PATENT CONSULTING, LLC (57) ABSTRACT

A compact silicon waveguide mode converter, a dielectric meta-surface structure based on periodical oblique subwavelength perturbations, including a top silicon structure with oblique subwavelength perturbations etched in certain periods with period length of Λ, a duty cycle and an oblique angle θ on the SOI substrate. The invention adopts an all-dielectric meta-surface structure with oblique subwavelength perturbation, which can achieve a compact mode conversion from fundamental mode to arbitrary high-order mode of silicon waveguide, and can improve the optical communication capacity greatly.

4 Claims, 6 Drawing Sheets

(51) Int. Cl.
- *G02B 6/32* (2006.01)
- *G02B 6/34* (2006.01)
- *G02B 6/10* (2006.01)
- *G02B 6/14* (2006.01)
- *G02B 6/136* (2006.01)
- *G02B 6/12* (2006.01)

(52) U.S. Cl.
CPC ............ *G02B 2006/12097* (2013.01); *G02B 2006/12147* (2013.01); *G02B 2006/12152* (2013.01)

(58) Field of Classification Search
CPC ........... G02B 2006/12147; G02B 2006/12152; H01P 5/00
USPC ............ 385/28–32, 34, 36, 37, 50, 129–131
See application file for complete search history.

(56) References Cited

U.S. PATENT DOCUMENTS

| | | | |
|---|---|---|---|
| 2002/0015555 A1* | 2/2002 | Okayama | G02B 6/29334 385/27 |
| 2021/0063638 A1* | 3/2021 | Baets | G02B 6/12007 |

* cited by examiner

ULTRA-COMPACT SILICON WAVEGUIDE MODE CONVERTER BASED ON META-SURFACE STRUCTURE

TECHNICAL FIELD

The invention relates to a technology in the field of light wave, in particular to an ultra-compact silicon waveguide mode converter based on meta-surface structure.

BACKGROUND TECHNOLOGY

The on-chip mode division multiplexing (MDM) technology can improve the transmission capacity significantly by utilizing the spatial mode of the silicon multimode waveguide. The MDM on silicon wafers has attracted a lot of attention on its compact device size and compatibility with the complementary metal oxide semiconductor (CMOS) manufacturing process.

As a key component in MDM system, the mode converter is generally large in size, with limited working bandwidth and large insertion loss. The meta-surface is a two-dimensional artificial structure with subwavelength characteristics, which can control the phase, amplitude and polarization of the beam effectively and solve the abovementioned problems.

CONTENTS

The present invention presents an ultra-compact silicon waveguide mode converter based on a meta-surface structure to solve the problem of excessive loss and crosstalk in the prior art, wherein an all-medium meta-surface structures with oblique subwavelength perturbations is adopted, the compact mode conversion from fundamental mode to arbitrary high order mode can be realized, and the optical communication capacity can be enhanced greatly.

The invention is realized through the following technical scheme:

A compact silicon waveguide mode converter, wherein the converter is a dielectric hypersurface structure based on periodical oblique subwavelength perturbations, including a top silicon structure with oblique subwavelength perturbations etched in certain cycles with a period of $\Lambda$, a duty cycle and an oblique angle $\theta$ on the SOI substrate.

The top silicon structure with oblique subwavelength perturbations meets the mode coupling equation $$-\frac{\partial A}{\partial z} = jK_{ab}Be^{j(\beta_a - \beta_b)z} \text{ and } -\frac{\partial B}{\partial z} = jK_{ba}Ae^{-j(\beta_a - \beta_b)z}$$

wherein A and B are the amplitudes of modes a and b, and $\beta_a$ and $\beta_b$ show the propagation coefficients of modes a and mode a respectively. $K_{ab}$ and $K_{ba}$ represent the exchange coupling coefficient between waveguide modes a and b, namely the mode coupling coefficient, and $K_{ab}=K_{ba}^*$.

The periodical oblique subwavelength perturbation structure is based on changing the traditional mode coupling coefficient from constant coefficient to a variable coefficient, which can reduce the loss in the coupling process and realize the mode coupling in a very short distance.

The phase matching condition of the mode converter meets the equation:

$$\delta = \frac{2\pi}{\sqrt{\Delta\beta^2 + 4\kappa_{ab}^2}}.$$

According to this condition, modes $TE_a$ and $TE_b$ are in different phases after propagation on $\delta/2$. Therefore, $K_{ab}$ needs to be changed from positive to negative after $\delta/2$ so as to ensure that the structure always contributes to the transformation from the mode $TE_a$ to the mode $TE_b$.

The coupling process of the mode converter needs one coupling cycle only, namely the coupling length L=$\delta$, and the oblique angle $$\theta = \arctan\left(\frac{w}{(j+1)\delta}\delta\right)$$

where, w means the waveguide width, and $\Lambda$ means the cycle of the subwavelength structure.

TECHNICAL EFFECT

Compared with the prior art, the present invention applies the oblique subwavelength perturbation structure to the mode coupler, which can realize the mode conversion of arbitrary waveguide mode by changing the structural parameters (angle, cycle), and can convert the $TE_0$ mode to $TE_1$, $TE_2$ or $TE_3$ mode respectively. The mode conversion lengths of $TE_0$-$TE_1$, $TE_0$-$TE_2$ and $TE_0$-$TE_3$ waveguide mode converters are 3.96 μm, 3.686 μm and 3.564 μm respectively, which is significantly better than the existing device structure. In the wavelength range of 1500-1625 nm, the insertion loss of the mode converter is lower than <1 dB and mode crosstalk<−10 dB.

SPECIFIC IMPLEMENTATION MODE

Figure 1A:
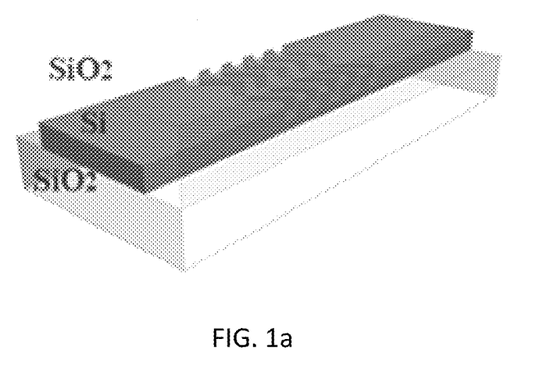
FIG. 1a is the 3D schematic diagram of the on-chip mode converter.
Figure 1B:
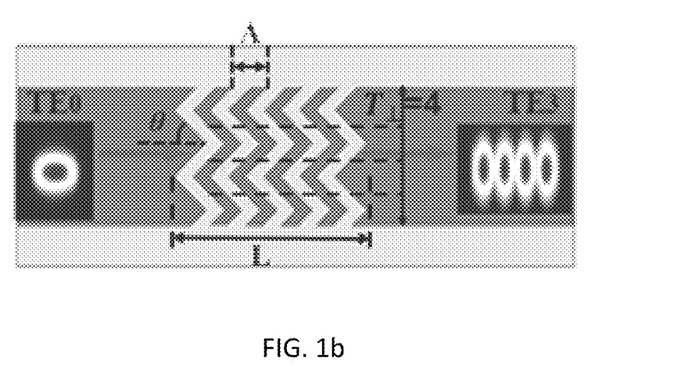
FIG. 1b is cross-section view of the mode converter at different z position.

As shown in FIG. 1, this embodiment relates to an ultra-compact silicon waveguide mode converter based on a meta-surface structure, wherein FIG. 1(a) is the 3D structure diagram of the device, and FIG. 1(b) is the cross-section view of the mode converter at different z position. The meta-surface structure is fabricated by etching the 220 nm-thick top silicon layer on the SOI substrate with the etching depth of 110-130 nm and silica cladding is adopted as a protective layer. In addition, the etching depth is designed to ensure that the meta-surface structure will not cause too much insertion loss to the silicon base multimode waveguide and cause enough refractive index disturbances for mode conversion at the same time.

Figure 2A:
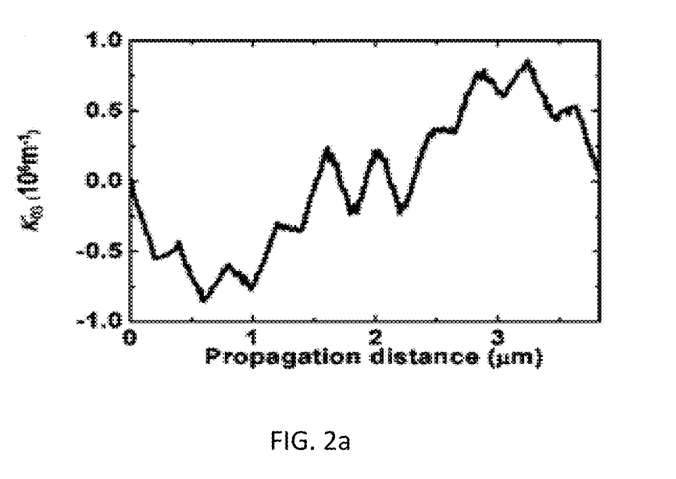
FIG. 2a is a diagram of the relation between the coupling coefficient $K_{03}$ of $TE_0$ and $TE_3$ modes.
Figure 2B:
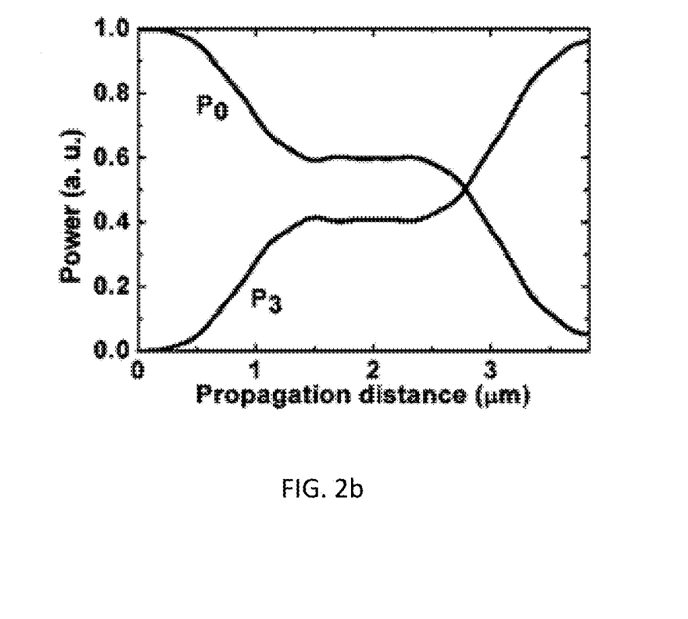
FIG. 2b is the change of energy with the propagation length.

FIG. 2(a) shows the relations between the coupling coefficient and the propagation length for the $TE_0$ to $TE_3$ mode conversion. The coupling coefficient of the mode changes in the propagation direction, which is conducive to the realization of the pattern transformation process. As shown in FIG. 2(b), the change of mode purity P3 of $TE_3$ gradually increases with the change of mode coupling coefficient in FIG. 2(a), namely from $TE_0(P_0)$ to $TE_3(P_3)$. The mode coupling coefficient is further expressed as $$\kappa_{ab}(z) = \frac{\omega}{4} \int\int_S E_a^*(x, y) \Delta\varepsilon(x, y, z) E_b(x, y) dxdy$$

of which, $E_a(x, y)$ and 和l $E_b(x, y)$ represent the field distribution of waveguide modes a and b under the condition of no perturbation, ω represents the switch frequency, $\Delta\varepsilon(x, y, z)$ represents the change of dielectric constant corresponding to the cyclic perturbation associated with etching shape.

It can be seen that the coupling coefficient between the target modes is approximately close to the order of $10^6$/m by etching the specific meta-surface structure on the silicon base multimode waveguide. At the same time, the phase mismatch caused by different equivalent refractive indices of the mode can be compensated effectively and the conversion efficiency between the modes can be enhanced by controlling the positive and negative distribution of the coupling coefficient in the length of the mode conversion area.

When the light is incident in the $TE_0$ mode under the initial conditions, namely the amplitudes of the modes $TE_0$, $TE_1$, $TE_2$ and $TE_3$ are $A_0=1$ and $A_1=A_2=A_3=0$, respectively. The mode coupling conversion equation is solved numerically by Matlab, and the energy of each mode in different lengths in the mode conversion process can be obtained.

This embodiment can realize any high order mode conversion, and waveguide mode conversions of $TE_0$-$TE_1$, $TE_0$-$TE_2$ and $TE_0$-$TE_3$ are taken as examples in the followings.

FIG. 2(b) shows the conversion rule of $TE_0$ and $TE_3$ modes in the propagation direction, and their energies are calculated by $P_1=A_1*A_1$ and $P_3=A_3*A_3$ respectively. It can be seen from the figure that the mode $TE_0$ is completely converted to the $TE_3$ mode within a distance of 3.83 μm with a theoretical conversion efficiency as high as 96.07%.

As shown in FIG. 2, the shape of a single broken line and the resulting disturbance of the waveguide refractive index are also different for different modes of optical field distribution to maximize the coupling coefficient in the mode coupling equation. In addition, the total length of the meta-surface structure needs to be controlled so that the light wave can complete the mode conversion just within this distance.

Figure 3A:
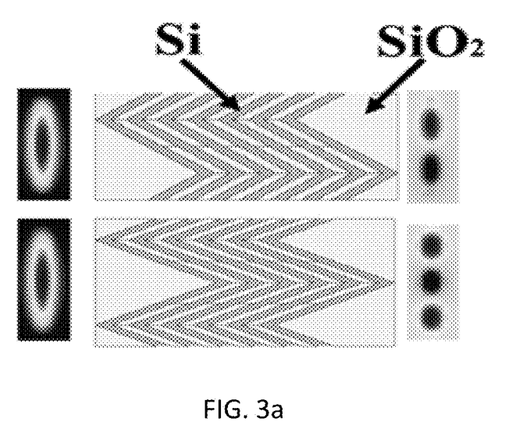
FIG. 3a shows the meta-surface structure designed for $TE_0$ to $TE_1$ mode conversion.
Figure 3B:
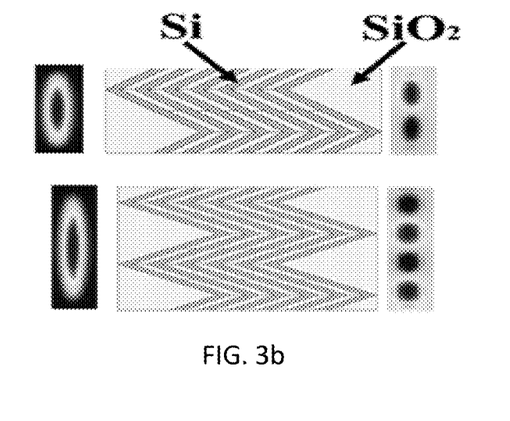
FIG. 3b shows the meta-surface structure designed for $TE_0$ to $TE_2$ mode conversion.
Figure 3C:
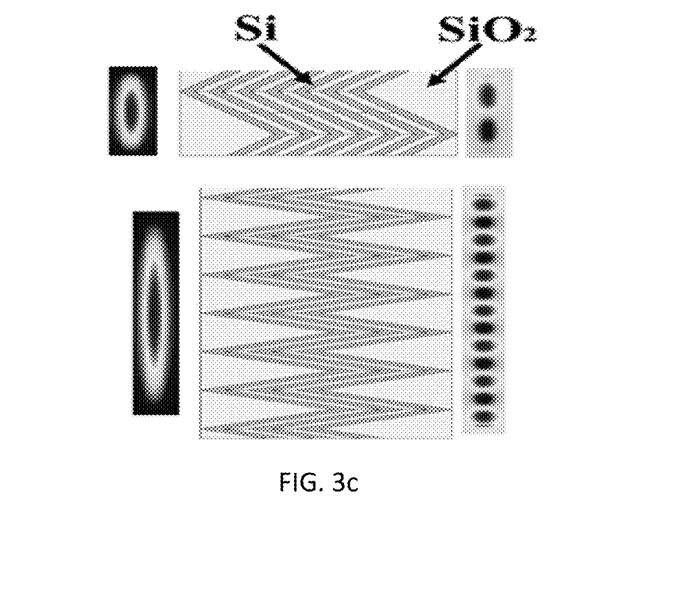
FIG. 3c shows the meta-surface structure designed for $TE_0$ to $TE_3$ mode conversion.

As shown in FIG. 3, the number of longitudinal periods of the structure is $T_1=n+1$, wherein n indicates mode number, and the $T_\perp$ for $TE_0$-$TE_1$, $TE_0$-$TE_2$, $TE_0$-$TE_3$ and $TE_0$-$TE_{12}$ are 2, 3, 4 and 13 respectively.

The waveguide width, oblique angle and period of the oblique meta-surface structure can be optimized by the simulation results of 3D-FDTD and the parameters of coupler in modes $TE_0$-$TE_1$, $TE_0$-$TE_2$ and $TE_0$-$TE_3$ are shown in Table 1. Finally, the coupling lengths of the mode couplers are 3.96 μm, 3.686 μm and 3.564 μm, respectively.

TABLE 1

| Mode conversion | Width (w) [nm] | Number of periods (Λ) [nm] | Length (L) [μm] | Oblique angle (θ) [°] |
|---|---|---|---|---|
| $TE_0$-to-$TE_1$ | 1100 | 500 | 3.96 | 13 |
| $TE_0$-to-$TE_2$ | 1800 | 500 | 3.686 | 16 |
| $TE_0$-to-$TE_3$ | 2000 | 300 | 3.564 | 16 |

It can be seen in FIG. 3 that the shape of the zigzag structure and the resulting disturbance of the waveguide refractive index are also different for different modes of optical field distribution to maximize the coupling coefficient in the mode coupling equation. In addition, the total length of the meta-surface structure needs to be controlled, so that the light wave can complete the mode conversion just within this distance. The coupling length should be carefully designed to make sure the mode conversion process is completed.

The mode converter abovementioned is shown in FIG. 1.b and its longitudinal period number is consistent with the conversion mode $T_\perp=n+1$, wherein n is the number of modes. The schematic configurations for different mode conversions are shown in FIG. 3 and the number of arrows of the structure is related to the number of conversion modes.

Figure 4A:
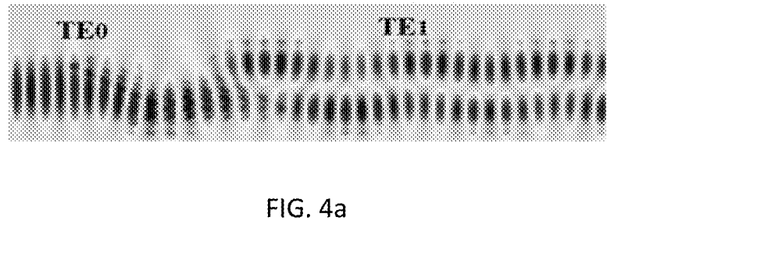
FIG. 4a shows the light field distribution diagrams of $TE_0$ to $TE_1$ mode conversion.
Figure 4B:
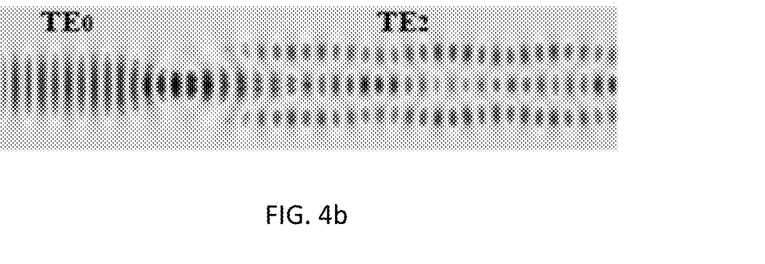
FIG. 4b shows the light field distribution diagrams of $TE_0$ to $TE_2$ mode conversion.
Figure 4C:
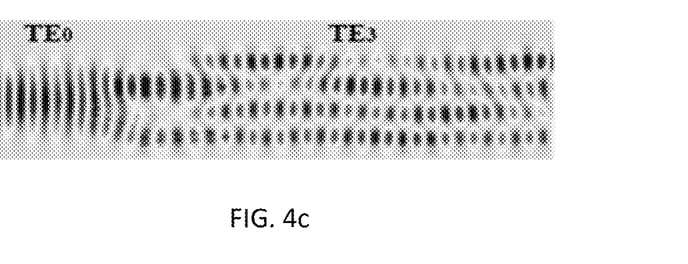
FIG. 4c shows the light field distribution diagrams of $TE_0$ to $TE_3$ mode conversion.
Figure 5A:
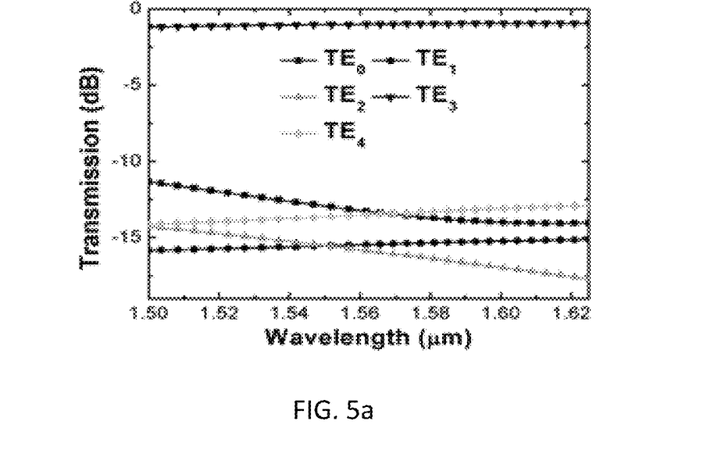
FIG. 5a is a schematic diagram of the relationship between mode transmittance and wavelength.
Figure 5B:
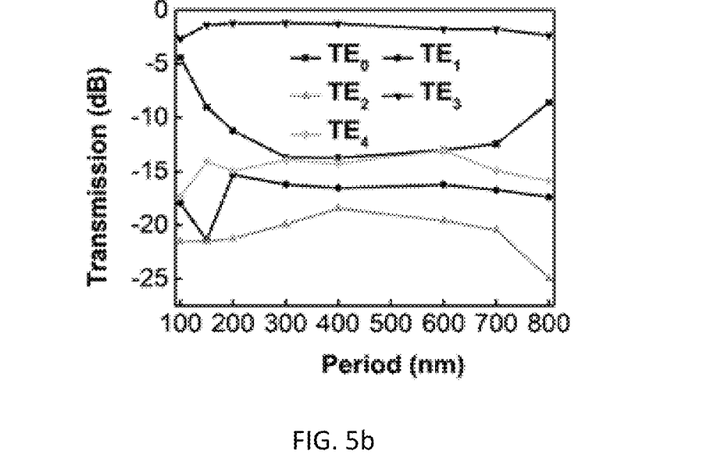
FIG. 5b is a schematic diagram of the relationship between mode transmittance and period value.
Figure 5C:
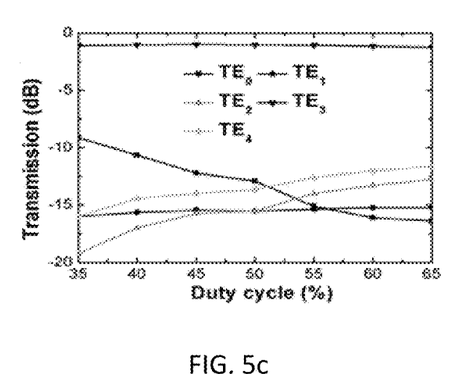
FIG. 5c is a schematic diagram of the relationship between mode transmittance and duty cycle ratio.
Figure 5D:
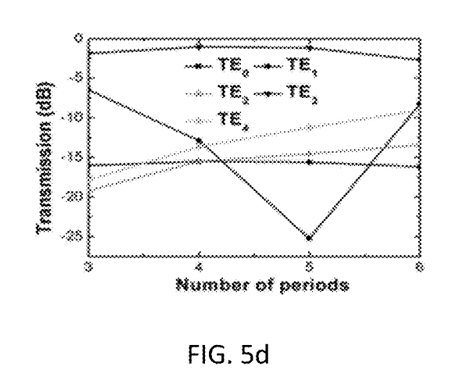
FIG. 5d is a schematic diagram of the relationship between mode transmittance and period number.

In this embodiment, 3D finite-difference time-domain (3D-FDTD) method is used to simulate the mode conversion process of the structure. The simulated electric field distributions of the $E_y$ component for the TE0-TE1 and TE0-TE2 conversions, are shown in FIGS. 4(a) and (b), respectively.

As shown in FIG. 5, the 3D finite-difference time-domain (3D-FDTD) method is used to calculate the transmittance of $TE_0$ to $TE_3$ mode converter to different modes. It can be seen that the insertion loss of the mode converter is lower than ~1 dB and mode crosstalk<−10 dB in the wavelength range of 1,500-1,625 nm. The insertion loss and crosstalk don't change significantly as the cycle varies between 300-700 nm. In addition, duty cycle must be controlled within 50±5% to ensure the device works properly. The $TE_0$ mode crosstalk is the most sensitive to the number of cycles because the number of cycles is direct correlation to the length of the transition zone. When the number of cycles is 5, the crosstalk between modules is the lowest.

Compared with various mode converters and dielectric materials, the mode converter of the present invention is significantly shorter than the device structure previously reported.

The specific implementation mentioned above may be partially adjusted in different ways by technicians in the field on the premise of not deviating from the principle and purpose of the invention. The scope of protection of the invention is subject to the claims and is not limited by the specific implementation. Any realization schemes within the scope shall be bound to this invention.

What is claimed is:

1. A compact silicon waveguide mode converter based on a dielectric meta-surface structure of periodical oblique sub-wavelength perturbations, the compact silicon waveguide mode converter comprising a top silicon structure with oblique subwavelength perturbations etched in certain cycles with periodical length of $\Lambda$, a duty cycle and an oblique angle $\theta$ on the Silicon-on-Insulator (SOI) substrate, $\Lambda$ represents the cycle of the subwavelength structure; wherein the top silicon structure with oblique subwavelength perturbations meets the mode coupling equation:

$$\frac{\partial A}{\partial z} = j\kappa_{ab}Be^{j(\beta_a - \beta_b)z} \text{ and } -\frac{\partial B}{\partial z} = j\kappa_{ba}Ae^{-j(\beta_a - \beta_b)z},$$

wherein A and B are the amplitudes of modes A and B, and $\beta_a$ and $\beta_b$ show the propagation coefficients of the mode A and the mode B respectively; $\kappa_{ab}$ and $\kappa_{ba}$ represent the exchange coupling coefficient between waveguide modes a and b, namely the mode coupling coefficient, and $\kappa_{ab} = \kappa_{ba}^*$; j represents the order of mode $TE_j$; z represents the coordinate of the propagation direction;

wherein the mode coupling coefficient is further expressed as $$\kappa_{ab}(z) = \frac{\omega}{4}\int\int_S E_a^*(x, y)\Delta\varepsilon(x, y, z)E_b(x, y)dxdy, \text{ of which, } E_a(x, y)$$

and $E_b(x, y)$ represent the field distribution of waveguide modes a and b under the condition of no perturbation, $\omega$ represents the switch frequency, $\Delta\varepsilon(x, y, z)$ represents the change of dielectric constant corresponding to the cyclic perturbation, associating with etching shape; a represents the silicon waveguide length etched in one period divided by $\Lambda$.

2. The compact silicon waveguide mode converter according to claim 1, wherein the phase matching condition of the mode converter meets the equation:

$$\delta = \frac{2\pi}{\sqrt{\Delta\beta^2 + 4\kappa_{ab}^2}};$$

$\delta$ is the phase coupling length; according to this condition, modes $TE_a$ and $TE_b$ are in different phases after propagation on $\delta/2$; $\Delta\beta$ is the difference between the propagation constants of the two modes; therefore, $K_{ab}$ needs to be changed from positive to negative after $\delta/2$, so as to ensure that the mode $TE_a$ always contributes to the transformation to the mode $TE_b$.

3. The compact silicon waveguide mode converter according to claim 2, wherein the coupling process of the mode converter needs one coupling cycle only, namely the coupling length $L=\delta$, and the oblique angle $$\theta = \arctan\left(\frac{w}{(j+1)}\delta\right);$$

in the equation, w means the waveguide width.

4. The compact silicon waveguide mode converter according to claim 1, wherein the meta-surface structure graph is realized by etching 220 nm top silicon on the SOI substrate, the etching depth is 110-130 nm, and the surface is covered with silica as a protective layer.

* * * * *